(No Model.)

H. C. SWAN.
VEHICLE STEP.

No. 544,136. Patented Aug. 6, 1895.

WITNESSES

INVENTOR
Henry C. Swan
by his attorneys
B. Bakewell & Sons

UNITED STATES PATENT OFFICE.

HENRY C. SWAN, OF OSHKOSH, WISCONSIN.

VEHICLE-STEP.

SPECIFICATION forming part of Letters Patent No. 544,156, dated August 6, 1895.

Application filed October 3, 1894. Serial No. 524,786. (No model.)

*To all whom it may concern:*

Be it known that I, HENRY C. SWAN, of Oshkosh, in the county of Winnebago and State of Wisconsin, have invented a new and useful Improvement in Vehicle-Steps, of which the following is a full, clear, and exact description, reference being had to the accompanying drawings, in which—

Figure 1:
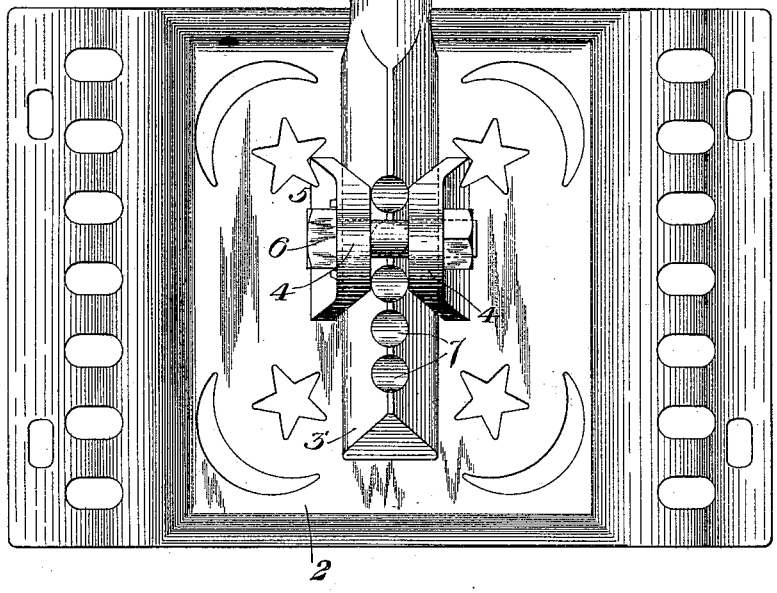
Figure 2:
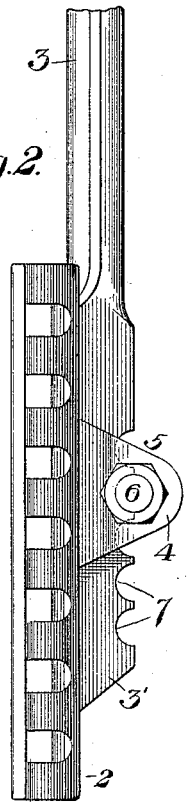
Figure 3:
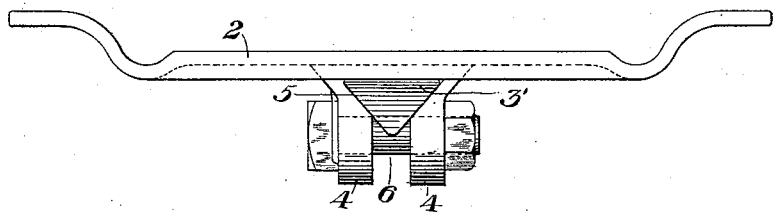

Figure 1 is a bottom plan view of my improved vehicle-step. Fig. 2 is a side elevation, and Fig. 3 is an end elevation thereof.

In the drawings, 2 represents the vehicle step or pad, and 3 the shank to which it is adjustably connected. In order to make this adjustable connection, I provide the step on its under side with two separated lugs 4 4, so shaped as to afford an intermediate socket 5 of wedge shape, and connect the lugs by a bolt 6. The shank 3 has at its outer end a portion 3' of wedge shape in cross-section which fits slidingly within the socket formed by the lugs 4, and preferably has at its lower edge notches 7, in which the bolt 6 can fit.

The step is preferably made of a malleable casting with the lugs formed integral with its under side.

When the step is to be used it is fitted on the shank, the end portion of which passes through the socket 5, and the step is adjusted on the shank so as to secure the desired degree of projection from the vehicle, the position being such that one of the notches 7 shall register with the bolt-holes in the lugs. The bolt is then passed through said holes and through the registering notch, and when it is then tightened the lugs are clamped together upon the shank and hold it to the step very securely. The tightness of the clamping action is enhanced by the shape of the shank and lugs, which, being of wedge form, not only press inwardly against the shank but also press downwardly thereon. The notches in the shank in which the bolt fits assist in preventing endwise motion of the step. They are also convenient in facilitating the adjustment, for opposite each notch I may apply to the shank a figure or mark indicating the extent of projection which the step will have when the respective notches are opposite to the bolt-holes in the lugs.

Within the scope of my invention, as defined in the broader claims of this specification, the shape and construction of the parts may be varied, and the several claims are unqualified by limitations not appearing therein but peculiar to other claims.

I claim—

1. A vehicle step having on its under side integral clamping lugs, with an intermediate socket in which the shank can be adjustably fitted, and means for clamping the lugs together upon the shank; substantially as described.

2. A vehicle step having on its under side integral clamping lugs, with an intermediate socket in which the shank can be adjustably fitted, and means for clamping the lugs together upon the shank, said lugs and shank being of wedge-shape; substantially as described.

3. A vehicle step having on its under side integral clamping lugs, with an intermediate socket in which the shank can be adjustably fitted, a clamping bolt, and a shank having notches adapted to fit the bolt; substantially as described.

In testimony whereof I have hereunto set my hand.

HENRY C. SWAN.

Witnesses:
MARTIN O. SENSENY,
EMIL W. JAITE.